(No Model.) 2 Sheets—Sheet 1.

I., W. J. & T. G. HEMPY.
CORN HARVESTER.

No. 511,268. Patented Dec. 19, 1893.

Witnesses
A. S. Bishop
R. W. Bishop

Inventors
Isaac Hempy
Wilbur J. Hempy
Thomas G. Hempy

By J. W. Tenner, Attorney

THE NATIONAL LITHOGRAPHING COMPANY,
WASHINGTON, D. C.

(No Model.) 2 Sheets—Sheet 2.

I., W. J. & T. G. HEMPY.
CORN HARVESTER.

No. 511,268. Patented Dec. 19, 1893.

UNITED STATES PATENT OFFICE.

ISAAC HEMPY, WILBUR J. HEMPY, AND THOMAS G. HEMPY, OF LE ROY, KANSAS.

CORN-HARVESTER.

SPECIFICATION forming part of Letters Patent No. 511,268, dated December 19, 1893.

Application filed March 1, 1893. Serial No. 464,268. (No model.)

*To all whom it may concern:*

Be it known that we, ISAAC HEMPY, WILBUR J. HEMPY, and THOMAS G. HEMPY, citizens of the United States, residing at Le Roy, in the county of Coffey and State of Kansas, have invented certain new and useful Improvements in Corn-Harvesters; and we do hereby declare the following to be a full, clear, and exact description of the invention, such as will enable others skilled in the art to which it appertains to make and use the same.

The object of our invention is to provide a cheap and simple device by means of which standing corn may be easily and rapidly cut down with perfect safety to the operator. A further object is to provide means for easily adjusting the machine so as to cut the corn at any desired height. These objects we accomplish by the use of the construction illustrated in the accompanying drawings and the invention consists in certain novel features of the same which will be hereinafter first fully described and then pointed out in the claim.

Figure 1:
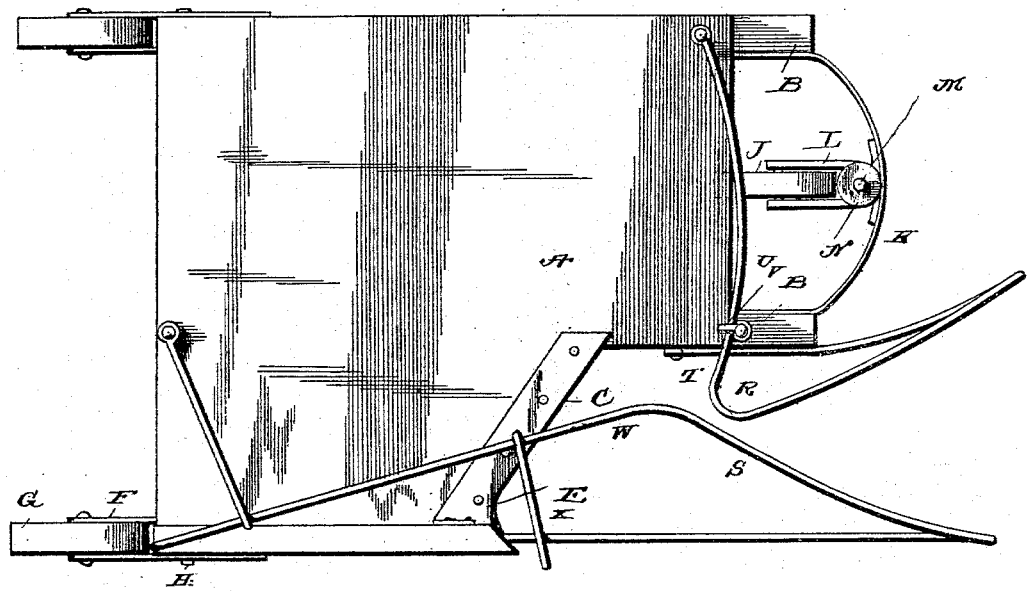
Figure 2:
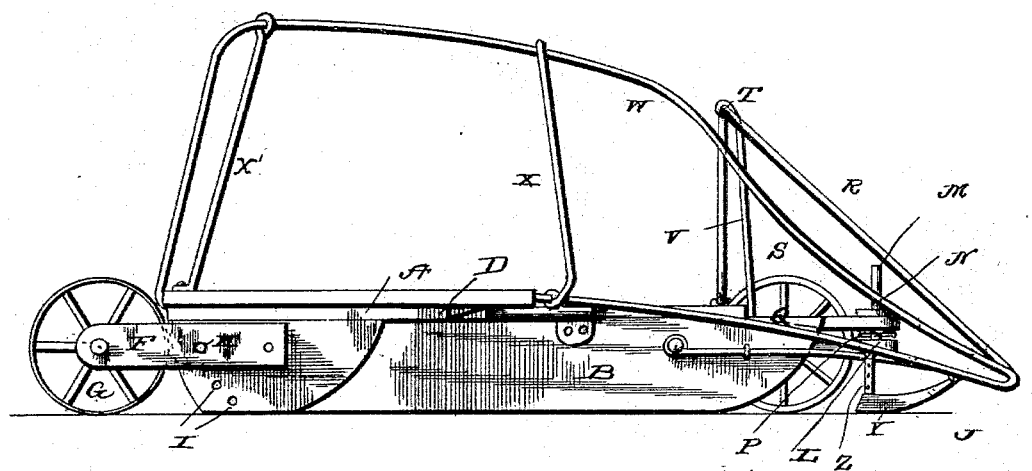
Figure 3:
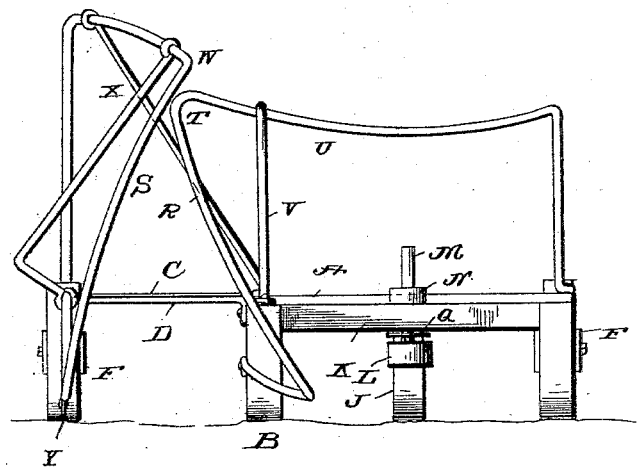
Figure 4:
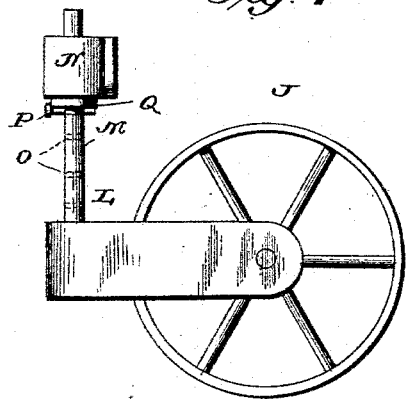
Figure 5:
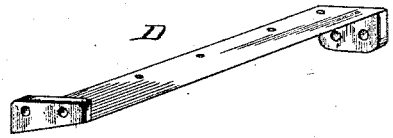

In the drawings referred to, Figure 1 is a plan view of a corn harvester constructed in accordance with our invention. Fig. 2 is a side elevation of the same. Fig. 3 is a front elevation of the same, and Figs. 4 and 5 are detail views illustrating the manner of adjusting the height of the machine.

The frame of the machine consists of a platform A and runners B supporting the same. It will be noticed that there are three of these runners and that one of the side runners is shorter than the other two. The knife, C, extends obliquely between the middle runner and this shorter side runner and is supported by a bracket or casting D which is secured to said runners. The knife may have an entirely straight cutting edge but we prefer to provide it with a slight forward extension E at its outer end as the corn stalk is thereby given a cut on both sides and the effectual severing of the same is insured. To the outer runner, near the rear ends of the same, we pivot the brackets F upon the outer ends of which are journaled the rollers G. These rollers are held at the proper points to support the platform at the desired height by the pins or bolts H inserted through the brackets into one of a series of openings I formed in the runners. The front end of the platform is adjusted by means of the roller J which is mounted upon a curved bolster K secured to the front ends of the middle runner and the longer outer runner. The roller is journaled in a fork L from which a spindle M rises through a sleeve or bearing N on the inner side of the bolster. The spindle is provided with a series of diametrical perforations or openings O and a pin P is inserted through one of these openings and a collar Q below the sleeve or bearing to support the same and thereby hold the front end of the platform at the desired height. The shafts by which the machine is drawn over the ground are attached to the curved bolster K.

The stalks are guided to the knife and over onto the platform by means of rod or wire guides or guards R S. The guard or guide R is secured to the middle runner and extends forward therefrom, slightly to the left, a short distance. It is then bent backward and upward to the right to a point, T, above and slightly in advance of the knife from which point it is bent outward so as to form a curved rail U across the front of the machine. The end of the rail is bent downward and secured to the platform and the rail is further supported by standards V, as shown.

The guide or guard S is secured to the platform at the outer end of the knife and extends outward and slightly downward therefrom a distance sufficient to bring it into alignment with the front end of the guide R after which it is bent backward and upward and given an inward curve to a point W slightly in rear of the point T from which point it is carried backward and bent downward to the rear corner of the platform where it is secured. The front upper portion of the guide S is braced and supported by the brace X interposed between the upper and lower portions of said guide as clearly shown. The rear upper portion of the guide "S" is supported and braced by the brace "X'" secured to the guide "S" and carried down obliquely and secured to the rear end of the platform at or near the center. Near the front end of the guide S we provide the runner Y which is adapted to hold the point of the guide off the ground.

The operation of our improved machine will, it is thought, be readily understood. The machine is drawn over the ground in the usual manner and the guides R S will pass on opposite sides of the row of standing stalks so as to guide the same to the knife by means of which they will be severed. As the machine is drawn along, the points of the guide will pass under any fallen stalks and will thereby lift the same so that they may be acted upon by the machine. The forward motion of the guides will force the stalks toward the points T W and after the point T has passed the stalk the continued forward movement of the machine will force the stalk over toward the center of the platform. The knife will then be drawn through the stalk so as to sever the same after which it will fall upon the platform where it may be gathered by the the operator standing thereon. It will thus be noticed that it is not necessary for the operator to stand very near the knife and injury from that source is consequently reduced to a minimum. The curved rail U forms a support for the reins and also acts as a guard to prevent the stalks from falling over onto the team or interfering with the driver.

The machine is very simple in its construction and its advantages are thought to be obvious from the foregoing description without a detailed reference thereto.

Having thus described our invention, what we claim, and desire to secure by Letters Patent, is—

In a corn harvester the combination with a platform, of a series of three runners supporting the same, one of the outer runners being of a less length than the other runners, the platform being cut away at its forward edge between the inner and short runner, a stationary knife arranged at an incline and secured at one end to the inner and at its opposite end to the forward end of the short runner, a guiding frame secured to the side of the platform extending across and forwardly beyond the same, its upper bar being carried in at an inclination to a point beyond the center of the knife, a guide frame secured to the forward end of the inner runner and extending forwardly beyond the same, its upper bar being inclined upwardly and outwardly to a point substantially parallel with the center of the knife and in proximity to the upper bar of the outer guide, a right angled extension extending across and above the forward end of the platform, supports on the platform for said extension, and adjustable caster wheels at the front and rear of the machine, substantially as described.

In testimony whereof we affix our signatures in presence of two witnesses.

ISAAC HEMPY.
WILBUR J. HEMPY.
THOMAS G. HEMPY.

Witnesses:
GEO. J. PHILO,
J. W. METSKER.